United States Patent
Li et al.

(10) Patent No.: US 9,975,804 B2
(45) Date of Patent: May 22, 2018

(54) CONTINUOUS FLOW SYNTHESIS OF VO2 NANOPARTICLES OR NANORODS BY USING A MICROREACTOR

(71) Applicants: Jie Li, Darien, IL (US); Yugang Sun, Naperville, IL (US); Ralph T. Muehleisen, Oak Park, IL (US); Leah B. Guzowski, Chicago, IL (US); Xiaojie Yan, Darien, IL (US); Samuel Dull, Lemont, IL (US); Ioannina Castano, Lemont, IL (US)

(72) Inventors: Jie Li, Darien, IL (US); Yugang Sun, Naperville, IL (US); Ralph T. Muehleisen, Oak Park, IL (US); Leah B. Guzowski, Chicago, IL (US); Xiaojie Yan, Darien, IL (US); Samuel Dull, Lemont, IL (US); Ioannina Castano, Lemont, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days. days.

(21) Appl. No.: 15/487,276

(22) Filed: Apr. 13, 2017

(65) Prior Publication Data

US 2017/0297949 A1    Oct. 19, 2017

Related U.S. Application Data

(60) Provisional application No. 62/323,343, filed on Apr. 15, 2016.

(51) Int. Cl.
*C03C 4/02*    (2006.01)
*C03C 1/02*    (2006.01)
(Continued)

(52) U.S. Cl.
CPC ............ *C03C 4/02* (2013.01); *C03B 25/02* (2013.01); *C03C 1/02* (2013.01); *C03C 1/10* (2013.01); *C03C 3/04* (2013.01); *C03C 2204/00* (2013.01)

(58) Field of Classification Search
CPC .... C03C 1/02; C03C 1/10; C03C 3/04; C03C 4/02; C03C 2204/00; C03B 25/02
(Continued)

(56) References Cited

U.S. PATENT DOCUMENTS 8,553,333 B2   10/2013   Chang et al.
8,801,979 B2    8/2014   Chang et al.
(Continued)

OTHER PUBLICATIONS

Shaotang Li, Yamei Li, Meng Jiang, Shidong Ji, Hongjie Luo, Yanfeng Gao, and Ping Jin, Preparation and Characterization of Self-Supporting Thermochromic Films Composed of VO2(M)@SiO2 Nanofibers, ACS Appl. Mater. Interfaces 2013, 5, 6453-6457. © 2013 American Chemical Society.*
(Continued)

*Primary Examiner* — Bijan Ahvazi
(74) *Attorney, Agent, or Firm* — Cherskov Flaynik & Gurda, LLC

(57) ABSTRACT

The invention provides a method for producing composite nanoparticles, the method using a first compound capable of transitioning from a monoclinic to a tetragonal rutile crystal state upon heating, and having the steps of subjecting the first compound to a hydrothermal synthesis to create anisotropic crystals of the compound; encapsulating the first compound with a second compound to create a core-shell construct; and annealing the construct as needed. Also provided is a device for continuously synthesizing composite nanoparticles, the device having a first precursor supply and a second precursor supply; a mixer to homogeneously combine the first precursor and second precursor to create a
(Continued)

liquor; a first microreactor to subject the liquor to hydrothermic conditions to create an\isotropic particles in a continuous operation mode; and a second microreactor for coating the particles with a third precursor to create a core-shell construct.

12 Claims, 10 Drawing Sheets

(51) Int. Cl.
    *C03C 1/10*     (2006.01)
    *C03C 3/04*     (2006.01)
    *C03B 25/02*     (2006.01)

(58) Field of Classification Search
    USPC ............ 29/611; 252/582; 359/288; 427/162, 427/164; 428/34, 141, 328, 404; 977/773
    See application file for complete search history.

(56) References Cited

U.S. PATENT DOCUMENTS

2012/0298037 A1    11/2012    Paul et al.
2013/0101848 A1*    4/2013    Banerjee .................. C09K 9/00 428/402

OTHER PUBLICATIONS

Rong Li, Shidong Ji , Yame iLi, Yanfeng Gao, Hongjie Luo, Ping Jin, Synthesis and characterization of plate-like VO2(M)@SiO2 nanoparticles and thei rapplication to smart window, MaterialsLetters110(2013)241-244.*

Jingting Zhu, Yijie Zhou, Bingbing Wang, Jianyun Zheng, Shidong Ji, Heliang Yao, Hongjie Luo, and Ping Jin, Vanadium Dioxide Nanoparticle-based Thermochromic Smart Coating: High Luminous Transmittance, Excellent Solar Regulation Efficiency, and Near Room Temperature Phase Transition, ACS Appl. Mater. Interfaces 2015, 7, 27796-27803.*

Zhang Chen, et al., "Fine crystalline Vo2 nanoparticles: synthesis, abnormal phase transition temperatures and excellent optical properties of a derived VO2 nanocomposite foil," Journal of Material Chemistry A, 2014, 2, pp. 2718-2727.

Shu-Yi Li, et al., "Thermochromic undoped and Mg-doped Vo2 thin films and nano-particles: Optical properties and performance limits for energy efficient windows," Journal of Applied Physics, 115. (2014), pp. 053513-1-053513-10.

Lynn Yarris, "Self-Assembling Nanorods," Feb. 1, 2012.

Kari Thorkelsson, et al., "Direct Nanorod Assembly Using Block Copolymer-Based Supermolecules," Nano Letters, 2012, 12, pp. 498-504.

Yongxing Hu, et al., "A Generic Approach for the Synthesis of Dimer Nanoclusers and Asymmetric Nanoassemblies," Journal of the American Chemical Association, Jan. 24, 2013, pp. 2213-2221, S1-S10.

Vverner Stobber, et al., "Controlled growth of monodisperse silica spheres in the micron size range," Journal of Colloid and Interface Science, vol. 26, Issue 1, Jan. 1968, pp. 62-69.

Adrian M. Nightingale, et al., "Microscale Synthesis of Quantum Dots," Journal of Materials Chemistry, vol. 20, 2010, pp. 8454-8463.

Steven M. George, et al., Atomic Layer Deposition—An Overview, Chem Rev. 110 (2010) 111.

Delphine Longrie, et al., Reactor concepts for atomic layer deposition on agitated particles: A Review, J. Vac Sci. Technol. A 32 (2014) (010802).

Shi-Di Lan, et al. Heteroepitaxial TiO2@W-doped VO2 Core/shell nanocrystal films: preparation, characterization, and application as bifunctional window coatings, RSC Adv., 2015, 5, p. 73742.

* cited by examiner

| Area | Carbon (%) | Oxygen (%) | Vanadium (%) | Tungsten (%)* |
|------|------------|------------|--------------|---------------|
| 1 | 24.64 | 19.86 | 51.81 | 3.69 |
| 2 | 46.57 | 21.97 | 29.12 | 2.34 |
| 3 | 50.49 | 22.66 | 24.86 | 1.99 |
| 4 | 18.29 | 12.53 | 66.26 | 2.92 |

*Calculated doping level: 3.0

CONTINUOUS FLOW SYNTHESIS OF VO2 NANOPARTICLES OR NANORODS BY USING A MICROREACTOR

PRIORITY

This utility patent application claims priority to U.S. Provisional Application No. 62/323,343, filed on Apr. 15, 2016, the entirety of which is incorporated herein by reference.

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to components for dynamic windows and more specifically, this invention provides a nanoparticle composite and method for making a nanoparticle composite, wherein the composite can be used to produce thermochromic windows having optimized light transparency and heat control at moderate room and environmental temperatures.

2. Background of the Invention

Buildings consume up to 40 percent of energy generated in the United States. However, up to 30 percent of all energy intended for building use is lost through windows.

Efforts have been ongoing to develop dynamic windows which would minimize energy loss to the outside.

Buildings using state of the art window technologies are seeing improvements in energy efficiency and therefore cost reductions. For example, after installation of then state of the art energy efficient windows, the Empire State Building in New York reported energy savings of $2.4 million annually and cut carbon emissions by 4,000 metric tons. Given a total cost of the project of approximately $20 million (which involved the replacing/retrofitting more than 6,500 double hung windows), payback is less than 10 years.

Dynamic window growth is estimated at more than 20 percent annually. The total addressable market for dynamic windows is estimated at $577 million for buildings for 2019, and $185 million for automotive applications globally.

Notwithstanding the foregoing technical and economic merits of dynamic windows, adoption of this technology in residential and retrofit scenarios remains tepid. This is due to poor performance of inorganic $VO_2$ based thermochromic window films and also due to harsh reaction conditions and fabrication constraints.

For example, state of the art $VO_2$ based dynamic windows have limited solar transmittance (i.e., heat) modulation, or STM of less than 10 percent) and low luminous transmittance (i.e., visible light), or LT (i.e., less than 40 percent (out of 50 percent in total) and low luminous transmittance (i.e. Visible light), or LT of less than 40 percent. As such, a long standing problem with typical state of the art dynamic windows is they do not efficiently modulate STM. Also, these windows, such as those incorporating vanadium dioxide ($VO_2$), have high conversion temperatures (e.g., above 68° C. or 154° F.) which delays any thermochromic activity to well above typical comfort temperatures of about 25° C. (or 77° F.)

Modest improvements have been made in LT (from 34 percent to 39 percent at 25° C. and in STM (from 10 to 14 percent) but this involves using complicated multilayered films, some comprising high-reflective index dielectric materials. These high reflective index dielectric materials include $TiO_2$, $SiO_2$, $ZrO$, $SnO_2$, and $Sn:In_2O_3$ (or ITO). Both the materials and their requirement for vacuum based sputtering deposition make these improvements expensive.

Aside from the inherent limitations in the materials themselves, another drawback to state of the art systems is that the fabrication of electrochromic windows is expensive. Their overlaying film comprises several layers of materials and are based on a principle similar to metal-ion batteries. Methods of fabrication for state of the art dynamic windows which incorporate nanoparticles require harsh reaction conditions. First, fabrication is in batch mode, thereby resulting in inconsistent quality between batches. Separately, autoclave temperatures of between 220 and 400° C. are typically required, as are pressures in excess of 20 bars. Fabrication times are lengthy, at more than 24 hours, and typically 1 to 7 days.

State of the art nanoparticle fabrication protocols embody limited controllability for synthetic conditions, such as mixing, heat and mass transfer. Reactor explosion hazards are also present. Also, batch systems are poorly scalable, and require large footprints.

Ultrafast continuous flow hydrothermal systems have been used to synthesize nanoparticles. It is operated around, or higher than, the supercritical temperature and pressure (i.e. 374° C.; 221 atm) of water, and particle synthesis is carried out via a transient contact mode of reactants. The resident time of reactants within such reactors is typically no more than a minute. However, the size, morphology, and phase structure of the $VO_2$ particles have not been well controlled, which is largely caused by limited mixing between the heating fluid and the reactant stream.

A need exists in the art for a high-quality particulate window film and a process for producing a window film with enhanced light manipulating ability at transition temperatures of about 20 to 30° C. The window should be transparent to solar heat during cold days, and opaque to solar heat during warm days. At the same time, the window should be at least about 60 percent transparent to visible light. The window should be passive in that it utilizes no moving parts, mechanical aspects, or electrical power. Further, the system and method for producing the window system should use relatively inexpensive materials and not require harsh reaction conditions.

SUMMARY OF INVENTION

An object of the invention is to provide thermochromic substrates and methods for producing thermochromic substrates that overcome many of the disadvantages of the prior art.

Another object of the invention is to provide thermochromic windows and a method for making thermochromic windows. A feature of the invention is that uniform anisotropic nanoparticles coat transparent substrates such as glass, plastic, quartz, etc. An advantage of the invention is that the windows always transmit up to about 80 percent of available visible light no matter what the atmospheric temperature. The window blocks infrared radiation on warm (above about 30° C.) days. The same windows allow infrared radiation to pass through them on cold (below about 25° C.) days.

Yet another object of the present invention is to provide a continuous method for producing nano-composites particles for incorporation in thermochromic windows. A feature of the invention is the combination of micro reactors (to fabricate core particles) with continuous flow-type reactors (to create shells on the core particles), thereby encapsulating the core particles to create shell-core constructs. An advantage of the invention is that the process employs high-efficient agitating methods to enable rapid transient fluid mixing between heating source and the incoming reactant flow, which is a big challenge for a low-velocity laminar fluid. The invented process enables massive manufacturing of high quality $VO_2$ nano-rods with well-controlled size, narrow size distribution, aspect ratios, and pure M-phase in a single step. (Previous attempts to produce VO2 nanoparticles resulted in M-phase, A-phase and B-phase particles all being generated, in other words, poor-controlled size and phase.) This single step process occurs in significantly reduced reaction time, from days to minutes or even seconds, as compared to state of the art batch processing technology. Another advantage is that it will enable the implementation of an automated product separation system to allow running of reactions and achieving continuous separation of particulate product at the same time. An on-line and in-situ analysis of particle properties is also possible.

Another object of the present invention is to provide composite nanoparticle constructs entrained in a plastic based liquor, for application on transparent substrates. Such constructs may be present in the liquor at between about 1 and about 5 volume percent of the liquor. A feature of the invention is that the nanoparticles are tailored (e.g., size, shape and aspect ratios), the tailored particles are then coated, and the coated particles are homogeneously dispersed in a host dielectric matrix material. An advantage of the method is that heat reflection and light transmission characteristics of the construct can be tuned based on nanoparticle morphologies, inter-particle distance, and concentrations in the host plastic matrix. Generally, reaction conditions such as particle concentrations and/or applied external fields (such as magnetic fields, electromagnetic radiation, and electric fields), are chosen such that interparticle distances are adjusted to be approximately one half the wavelength of the radiation to be attenuated.

Still another object of the invention is to provide anisotropic nanoparticles having cost effective optical properties for use in energy efficient windows. A feature of the invention is the hydrothermal synthesis of $VO_2$ anisotropic nanoparticles (e.g., nanorods and nanotubes), and subsequent surface modification and deposition of the nanoparticles on a transparent substrate. An advantage of the method is that the aforementioned treatment of this relatively inexpensive oxide via element doping results in a material having crystal phase shift (monoclinic to rutile, and back again) at temperatures between about 25° C. and 68° C. Another advantage is that the anisotropic particles (e.g., nanorods) display stronger surface plasmon resonance (SPR) at their interface with the transparent substrate compared to isotropic particles.

Yet another object of the invention is to provide a continuous flow method to produce tailored nanoparticles. A feature of the continuous process is that it subjects reactants to microtube reactor spaces for resident times of more than about a second but less than about half an hour, and generally between about 0.1 minutes and about 5 minutes. An advantage of the continuous process is that the reactants flow through a tubular shaped reactor to enable particle nucleation and growth. Particle growth rate and morphology are controlled by applying heating and cooling temperatures locally along the flow path and different regions of the longitudinally extending portions of the tubular shaped reactor. Such localized application of heating or cooling means (e.g., electrical resistance wires wrapped around the outside periphery of the vessel, or placing the vessels in a furnace) facilitates the creation of separate stages of particle nucleation and growth, thus enabling control of nanoparticle size by tuning the resident time of the reactants along those regions of the heating and cooling loop. Such growth and morphology control is nonexistent in state of the art system inasmuch as residence times in those systems cannot be modified.

Briefly, the invention provides a method for producing composite nanoparticles, the method comprising selecting a first compound capable of transitioning from a monoclinic to a tetragonal rutile crystal state, subjecting the first compound to a hydrothermal synthesis to create anisotropic crystals of the first compound; encapsulating the first compound with a second compound to create a core-shell construct; and annealing the construct.

Also provided is a device for continuously synthesizing composite nanoparticles, the device comprising a first precursor supply and a second precursor supply; a mixer to homogeneously combine the first precursor and second precursor to create a liquor; a first microreactor to subject the liquor to continuous flow hydrothermic conditions to create anisotropic particles (wherein the first reactor may define a flow path with an inner diameter of one inch or less); and a second microreactor for coating the particles with a third precursor to create a core-shell construct. The precursors may also be combined in advanced to create a liquor.

The invention also provides a nanocomposite particle comprising a core region and a shell region.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
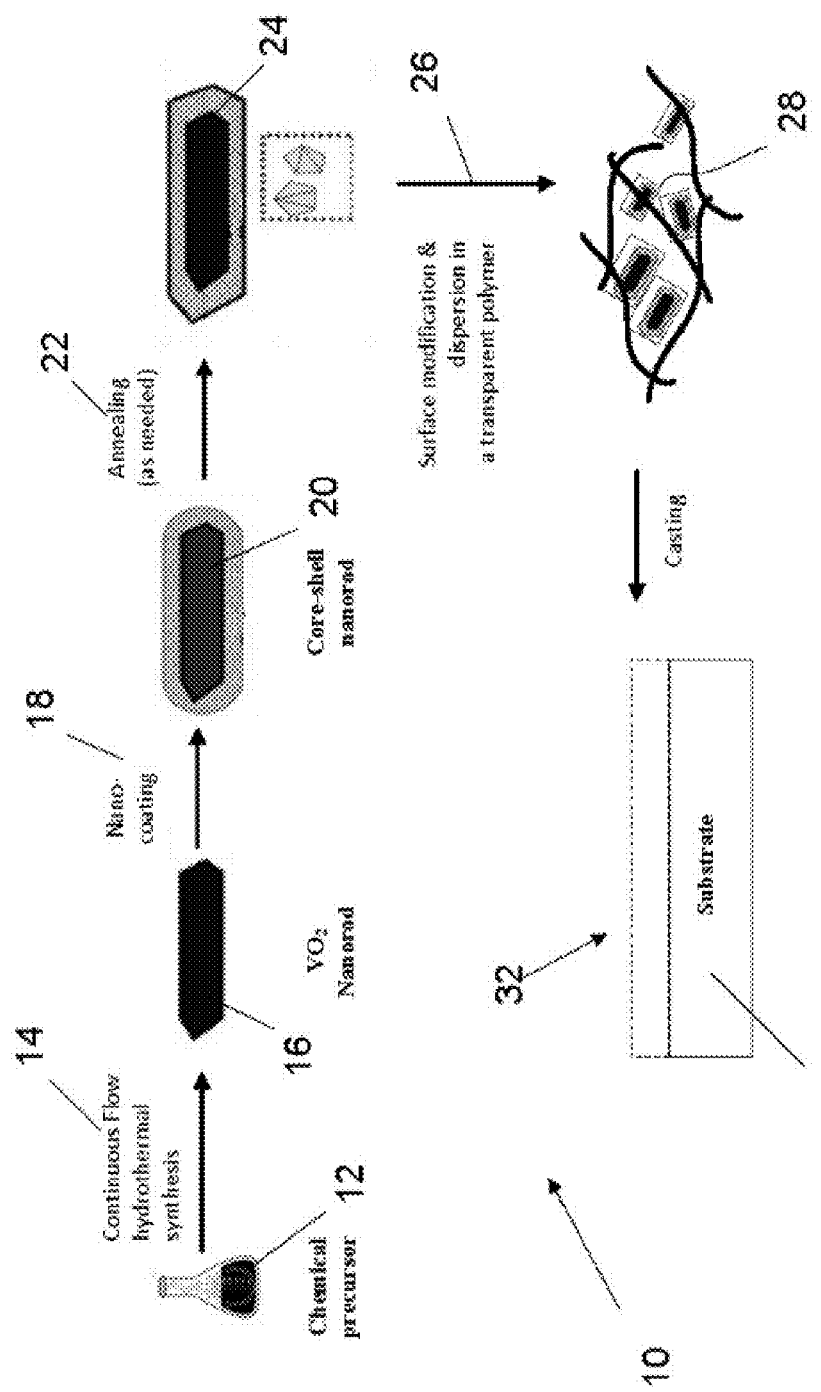
FIG. 1 is a flow chart depicting a continuous flow hydrothermal-based process for producing dynamic window constructs, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Two forms of transmittance are involved: solar (i.e. heat) transmittance and luminous (i.e., visible light) transmittance.

Dynamic windows allow visible light to pass through while selectively blocking infrared heat, depending on the ambient temperature. These windows utilize a thermochromic mechanism, which is a temperature-driven, radiation transmissivity change. As temperatures increase, the material experiences a reversible structural and/or chemical change which results in the corresponding electrical property transition from a semiconductor (monoclinic configuration) to a metal (tetragonal rutile configuration). The rutile metal-state at 2 eV, has negligible band gap compared to monoclinic crystals. As such, during winter weather, monoclinic crystal structures allow solar heat to pass, while during summer weather the crystal, now transformed to the rutile configuration, reflects incoming long wavelength light.

The invention provides a method and system for greatly increasing efficiencies in window insulation. The invention can be applied to window retrofits, new windows, and auto tinting. The invention also has application as a mode in laser weapon defense.

The invented single system integrates nanoparticle synthesis and nanoparticle surface coating. It provides thermochromic materials and the related processing technologies featuring nano-composites of anisotropic core-shell nanocomposites (e.g. nano-rods, nano-tubes, nano-cages and other asymmetrical forms) of $VO_2$. Aside from $VO_2$, the other solid oxide thermochromic materials are suitable, including but not limited to $V_2O_5$, $V_2O_3$, $VO$, $V_6O_{13}$, $Ti_2O_3$, $Ti_3O_5$, and combinations thereof. In an embodiment of the invention, these nanoparticles are substantially uniformly dispersed in a visible light transparent host matrix such that the concentrations of the nanoparticles are about the same throughout the matrix. In other embodiments, the nanoparticles may be more concentrated in some regions of the matrix compared to other regions. $VO_2$ nanoparticles with different sizes, shapes and aspect ratios are first synthesized to tune the SPR properties in those nanoparticles. Optionally, the reaction conditions are modified to dope the particles (for example with tungsten and/or magnesium) to tune the particle's temperature transition point from monoclinic to rutile phase. Doping tunes the charge density in the $VO_2$ material, which affects the energy required to close the band-gap of this material. An increasing doping amount leads to a lower transition temperature.

Once the particles are produced, they are dispersed in a high-refractive-index (i.e., more than 1.4) material using a sol-gel process. In an embodiment of the invention, this dispersion is homogeneous. In other embodiments, the dispersion is non-homogenous. In either case, this dispersion results in the particles being conformally coated by the high-refractive index material. This surface coating has two purposes: one is to enhance the nano-confining effect of the anisotropic particles, thus intensifying surface plasmon effect while simultaneously reducing the mismatching of refraction index between $VO_2$ (1.5~3.5) and air (~1.0). This controls reflection and increases light transparency. The other purpose is to protect $VO_2$ from oxidation and degradation.

A method for coating the particles includes a sol-gel process wherein $VO_2$ nanoparticles are coated with $SiO_2$, $TiO_2$, $SnO_2$, $In_2O_3$:Sn (or ITO), and combinations thereof. Coating thicknesses range from about 1 nm to about 30 nanometers.

This coating process results in a core-shell construct. A Stöber method was utilized to generate the construct. In one application of the method, ethanol is first mixed with an aqueous dispersion of core particles. Next, an aqueous solution of ammonium hydroxide and TEOS was added to the particle dispersion. This initiates the disposition of the oxide shells on the particles. The process can be performed at room temperature and pressure, with mechanical stirring maintained throughout. The resulting composites may then be washed with ethanol or some other polar solvent. A description of the coating method can be found in Hu, JACS 135, pp 2213 et seq (2013), the entirety of which is incorporated herein by reference.

After production of the core shell construct, the core-shell nanoparticles are dispersed on target matrixes (e.g., plastics, glass, screens, etc). This dispersion may be homogeneous or nonhomogeneous. In tempest applications, the screens may be metal. Also, the matrixes may be flexible so as to facilitate the production of non-flat and/or flexible windows, such as windows that can withstand impact without substantial fracturing. In an embodiment of the invention, the core-shell particles are arranged so as to be substantially all parallel with each other and at right angles to the matrixes. Density of the particles on the surface of the matrixes will vary. For example, given a 5 micron film thickness and 1 percent volume loading, density would be approximately 9 particles per square micron ($\mu m^2$). At 5 percent volume loading, the density would be approximately 45 particles/($\mu m^2$).

In an embodiment of the invention, the core-shell particles maybe embedded onto the surfaces of the matrixes or completely encapsulated by the matrixes. Surface embedment such that the core shell particles reside at least partially on the surface of the matrix, may confer surface roughening, which can further enhance radiation absorption qualities.

A salient feature of the final construct is that it embodies a single layer thin film. This feature makes it more economical to manufacture and apply compared to state of the art, multi-film technologies such as electrochromic devices with five-layer structure. The film can range in thickness from about 100 nm to about 100 µm, preferably from about 500 nm to about 10 µm' and most preferably from about 1 to 5 µm.

FIG. 1 depicts a method for production of a thermochromic window, the method designated generally as numeral 10. Chemical precursors 12 are subjected to continuous flow hydrothermal synthesis 14 in a micro-fluid reactor 48, such that particle synthesis is conducted in aqueous solution with water as the reaction media. The reaction may occur under a sub- or super-critical condition.

The advantages of hydrothermal synthesis includes the following:
Water is cheaper and environment friendly as compared to other syntheses in which the chemical solvents are used;
Elevated temperature can result in accelerated reaction kinetics, thus a short reaction time can be realized;
A reaction under elevated temperature and pressure (T/P), especially in super-critical condition, provides a reaction environment where heat and mass transfer exist, which increases reaction conversion efficiency and yield;
Finally, a continuous flow micro-reactor has limited explosion safety concerns since only a small fraction of reactant is heated at a time.

The aforementioned advantages of hydrothermal synthesis compares more favorably to state of the art particle synthesis protocols wherein all reactants are heated in autoclave (e.g., in batch mode). This has the potential of explosion if the autoclave is over-pressurized.

The hydrothermal process 14 creates $VO_2$ nanorods 16. Suitable precursors include, but are not limited to $V_2O_5$, $VOSO_4$, $VOCl_2$, and combinations thereof. Vanadium ion concentrations in the precursor range between about 0.02 and 1.0 mol/L. Spheres or rods ranging in size of between about 10 and about 300 nm result. Anisotropic particle fabrication begins with heating the reaction solutions to between approximately 240° C. and approximately 350° C., for between about 0.1 and about 5 minutes (and preferably less than 2 minutes). A short resident time results in small particles and the selection of the resident time depends on the reaction temperature. Preferably, reaction pressures are high enough to prevent water evaporation under that temperature. In one reaction sequence, the inventors found that a relatively long resident time resulted in pure M-phase $VO_2$ being produced.

The rods 16 are then subjected to a coating process 18. This coating process produces a particle 20 comprising a $VO_2$ core and a shell of some other dioxide (e.g. $SiO_2$). This coating (between approximately 1 and approximately 30 nm thick) provides a means for preventing sintering of the nanorods during a subsequent annealing step 22, if needed, and as described infra. The core-shell construct can be synthesized at near room temperatures (e.g., about 60° C.) via the Stöber reaction. Details of the Stöber reaction can be found in Controlled growth of monodisperse silica spheres in the micron size range Journal of Colloid and Interface Science, Volume 26, Issue 1, January 1968, Pages 62-69 Werner Stöber, Arthur Fink, Ernst Bohn, the entirety of which is incorporated herein by reference.

The core-shell construct 20 is subjected to inert gas-protected annealing 22 to convert $VO_2$ (A or B) phase if they are synthesized via hydrothermal reaction into $VO_2$ (M) phase that is the targeted thermochromic material. The two layered polymorphs $VO_2$(A) and VO2(B) are promising materials for science and technology. $VO_2$(A) is important for the study of strong electronic correlations resulting from structure and $VO_2$(B) is important for its use as electrode materials for batteries. The "M" designates "monoclinic".

As discussed supra, the core-shell construct prevents fluid communication between the $VO_2$ particles and ambient environment. Otherwise, it would display a refractive index in air that is different than the transparent substrate onto which it is applied, thereby resulting in hazing.

The annealed construct 24 is dispersed in deionized water to make a suspension 26 so as to facilitate its uniform dispersion in the organic matrix. The construct may undergo surface modification upon the addition of methylacryl-functional silane to facilitate dispersion of inorganic $VO_2/SiO_2$ in the organic matrix film. Suitable silane couplers are commercially available, including, but not limited to γ-methacryloyloxypropyltrimethoxysilane, which is marketed as KH-570 by Gaizhou Hengda Chemical Co. Ltd., Gaizhou City, China. Finally an ester-linked polymer (e.g., polyurethane) is added to convert the suspension 26 to a transparent hybrid polymer-nanorod dispersion 28. The core-shell construct 24 is well separated without fusion. Sonication may be used to enhance dispersion.

The resulting liquor 28 is then applied by a coating method (such as spinning coating, or a kiss gravure roll-to-roll coating method) to an optically transparent substrate 30 such as glass, quartz, plastic polyester film, e.g. polyethylene terephthalate (PET), and combinations thereof. The substrate is cured at between 75 and 95° C. at a temperature and for a time sufficient to harden the final construct. For example, heating temperatures of between about 75 and 95° C. and times from between about 5 and 15 minutes are suitable. (One embodiment hardened when subjected to 90° C. for about 10 minutes.) The result is a thermochromic window film or glass 32. The optically transparent substrate may be solid, or a mesh. The optically transparent substrate may be rigid or flexible.

At about 20° C., LT of the particles was about 46 percent and solar transmittance was 53 percent. At 90° C., LT was about 40 percent and solar transmittance was about 31 percent.

Nanoparticle Detail

Figure 5:
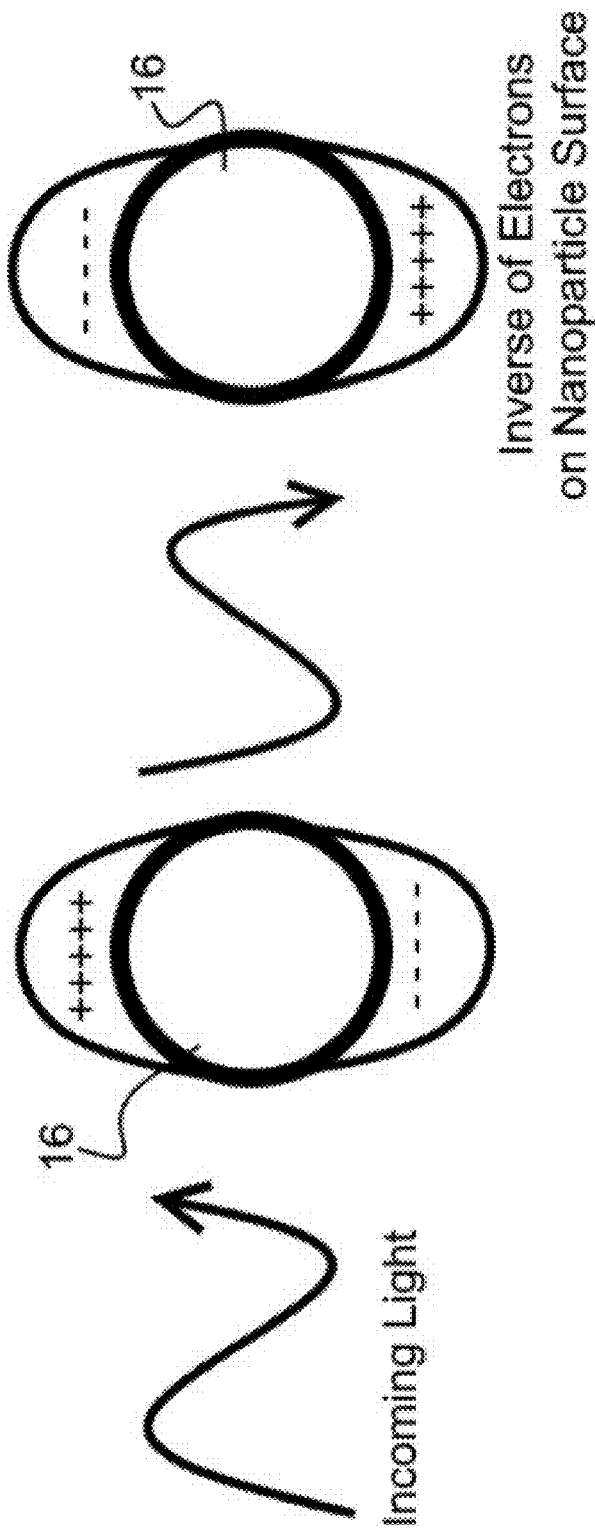
FIG. 5 is a schematic depiction of surface plasmon resonance, in accordance with features of the present invention.

A salient feature of the invention is the incorporation of nanoscaled (e.g., below about 200 nm length) particles with large aspect ratios. Surprisingly and unexpectedly, the inventors found that such large aspect ratios (between about 1:3 and about 1:10) particles exhibit stronger SPR than less anisotropic morphologies. The SPR phenomenon exists in the metallic phase (high temperature) but is absent in the insulating phase (relatively low temperature). The localization of the SPR, due to the high aspect ratio rods, is the result of more efficient separation of electrons, thereby contributing to the intensification of light absorption and scattering from metal nano-materials. This vastly improves the optical contrast between the metallic and semiconducting states in the near-IR region of the spectrum as a result of dielectric confinement. FIG. 5, discussed infra, describes the SPR phenomenon.

Throughout this specification, particles comprising $VO_2$ are discussed, but only for illustrative purposes only. Other materials which also exhibit semi-conductor to metal transitions (when similarly modified using techniques disclosed herein) at temperatures between 20° C. and 30° C. are also suitable, e.g., other vanadium oxides, chromium-rich pyropes, titanium oxides, zinc oxide and Pb(II) oxide. Such modifications include the use of dopants, surface treatments, and dimensioning, as discussed herein.

In addition, the invented nano-scale semiconductor enhances visible-light absorption, for short wavelengths, via band-gap widening. This increases luminous transmittance (LT). Moreover, dielectric properties of the nanoparticle surfaces can significantly affect light transport across the material, and that transport can be precisely tuned via nano-coatings (such as the $SiO_2$ coatings discussed supra) wherein the coatings may be conformal to the underlying core particle.

Generally, the nanoparticles are small enough to effect suitable quantum confinement of between about 2 and 10 nm between homo and lumo positions, in which homo is the acronym for highest occupied molecular orbital and lumo designates lowest unoccupied molecular orbital. This will allow for a larger band gap and subsequent blue-shifting of light absorption (i.e., from longer to shorter wavelengths). Together with solid volume fraction control, LT therefore increases from about 0.4 to about 0.8. More transparency results.

The inventors found that the size, shape and surface morphologies of the particles effect the SPR. Small core-shell nanoparticles are observed having significantly enhanced SPR. Further, anisotropic particles with aspect ratios of at least 1:2 have stronger SPR than isotropic particles. As such, nanorods and nanotubes have stronger SPR than spheres. This phenomenon is explained in conjunction with FIG. 5, discussed infra.

The inventors found that controlled surface properties also effect the optical effects of the nanoparticles. For example, upon coating the particles with a dioxide (e.g., $SiO_2$, $SnO_2$, $In_2O_3$, and combinations thereof), the refraction index mismatch between the particle and air is reduced. This leads to enhanced LT.

Nanorods are continuously prepared via flow-enhanced hydrothermal synthesis. A micro flow (between about 2 ml and about 40 ml/minute) process offers many advantages over autoclave batch reactors, including but not limited to acceleration of reaction rate, prompt start up, uniform temperature distribution in reaction solutions, facile control over reaction conditions, shortening of the synthesis cycle, and scalability. Therefore, high-quality nano composites (such as nanorods, nanotubes, nanocages, and other asymmetrical particles) and more narrow size distribution of the nanorods are synthesized.

The invented process and system controls the reaction conditions to obtain targeted nanoparticles. This is done by 1) rapidly heating up the flow system to a sufficiently high temperature such that the precursor can be decomposed to reach a super-situated state; 2) If hot-water is used as a heating medium, transient mixing between water and the reactant prevents a large temperature which results in mixed phase materials (e.g. A/B/M phase VO2); 3) After particle nucleation occurs, one can control the resident time and its distribution to manipulate particle growth:—short resident time leads to smaller particles; 4) rapidly cooling the system along the flow path is required since this can stop the growth of the particles per inter-particle agglomeration. By using a low PH value, it is feasible to obtain a higher ratio of anisotropic to isotropic materials.

Embodiments of the nanorods produced range in diameter from about 50 nm to about 150 nm, with about 80-120 nm being typical and 100 nm being the average. Nanoparticle length ranges from between about 0.1 microns to about 5 microns, preferably between about 0.2 microns and 1 microns, and most preferably about 0.5 microns. The nanorods may all be the same diameter and length in a particular application to optimize the resonance effect. Generally, rod dimensions are chosen to define an aspect ratio of between 2 and 5, and preferably approximately 3. In an embodiment of the invention, all of the nanorods in a single application have very similar aspect ratios.

In instances where A and B phases of $VO_2$ are generated hydrothermally, the inventors found that converting $VO_2$ (A) phase as synthesized to rutile $VO_2$ (M) phase can be realized by thermal annealing. The metal-to-insulator transition temperature of the VO2 (M) is relatively lower (approximately 65° C.) such that the modulation of IR absorption could better fit the energy consumption budget of buildings. Further conversion temperature reduction can be obtaining via Mg and/or W doping.

Thermal annealing of the rods facilitates this material phase conversion, whereby for example the rods are heated to at least about 450° C. in an inert atmosphere (e.g., argon, nitrogen, neon). Transformation can occur more quickly if heat in excess of 800° C. is applied.

Ideally, the nanorods are coated with an oxide layer (e.g. $SiO_2$) before annealing to prevent any sintering which would otherwise destroy the desired morphology of the rods. The oxide coating also serves as a refractive index matching material when the nanorods are utilized to form thermochromic films on glass or any other light transparent substrates. "Light" as discussed herein, includes wavelengths between approximately 380 nm and 10,000 nm, which includes infrared radiation. Visible light is defined at that between about 370 and about 720 nm.

Continuous Flow Micro-Reactor System Detail

The invented system applies hydrothermal synthesis, which is endothermic in nature, to continuously generate the nanoparticles or nanorods. It is capable of synthesizing kilogram quantities of high-quality core-shell nanocomposites every 24 hours. The system makes nanoparticles having the above-described well-controlled morphology (as described supra), and in a highly efficient and scalable manner. The system is capable of producing composite nanoparticles at temperatures below 450° C., and at pressures below 250 bars.

In an embodiment of the invention, given about 3.3 kilograms (kg) of starting material, at least 3 kg quantities of the particles can be produced in 24 hours, with a 10-channel device (having a channel inner diameter of about ⅛ inches), and a flow rate of about 3 ml/min in each channel. In another embodiment of the invention, given a 2.5 ml/min injection rate and 5 reactors (having a channel inner diameter of 1/16 inches) in parallel, during a 10 hour reaction period, approximately 625 grams of the nanoparticles are produced.

Salient features of the reactor system include incorporation of microflow reactors. A myriad of micro flow reactor configurations can be utilized, including coil, tubing, as well as acoustic/ultrasound probe, or fluid jet assisted tubing, (all shown in FIG. 2B) wherein flow rates are in the range of about 5 to about 30 ml per minute, given a tubing reactor volume of 16 ml.

To obtain uniform powders (e.g., core particles all having the same size and shape +/−5 to 10 percent), a rapid heating rate such as that provided by micro-flow channels or a supercritical heating water (e.g., >372° C., 221 bar), is preferred. As an example, a temperature rising speed of about 5° C. per second results in a more narrow size distribution of nanoparticles than that of 0.8° C. for a batch synthesis. Depending on the material, heating speed of about 4 to about 30° C. per second can be achieved by using both approaches as mentioned above. Preferably, the heating rate is about 15 to about 20° C. per second or higher. For the micro-tubing reactor, this increased heating rate results from the increase of the reactant-reactor contact area, while for the vessel reactor with supercritical water, it is due to heat transfer from the hot water to the reactant flow. Optionally, mixing is employed in vessel reactor scenarios.

Reactant flows along a flow path in the tubing reactor. The tube reactor creates the possibility of heating the reactants to different temperatures in various tubing locations. Initially, the reactant is in solution form, sans any solid phase. As the solution is heated while traversing the tubing reactor, hydrothermal reaction occurs, which is to say that the reaction occurs in hot water and not an organic solvent. This process facilitates both nanoparticle nucleation (at a first location) and particle growth (at a second location). Each location can be separately heated. This provides a means for synthesizing precisely controlled morphologies in a narrow size distribution (e.g., +/−1 nm). A detailed description of nanoparticle morphology control in microreactors can be found in J. Mater. Chem. 20 (2010) pp 8454, the entirety of which is incorporated by reference.

Nanoparticle size is also controlled by tuning the flowrate (e.g., the residence time) of the reactant and/or carrier fluid. Generally, the slower the flowrate, the longer the nanoparticle. Flow rate can be determined via the following equation $$Q = \Pi/4 \times d^2 \times U \times t,$$

where Q is the fluid quantity, d is the inner diameter of the tubular reaction chamber, U is velocity of the fluid and t is time.

Figure 2A:
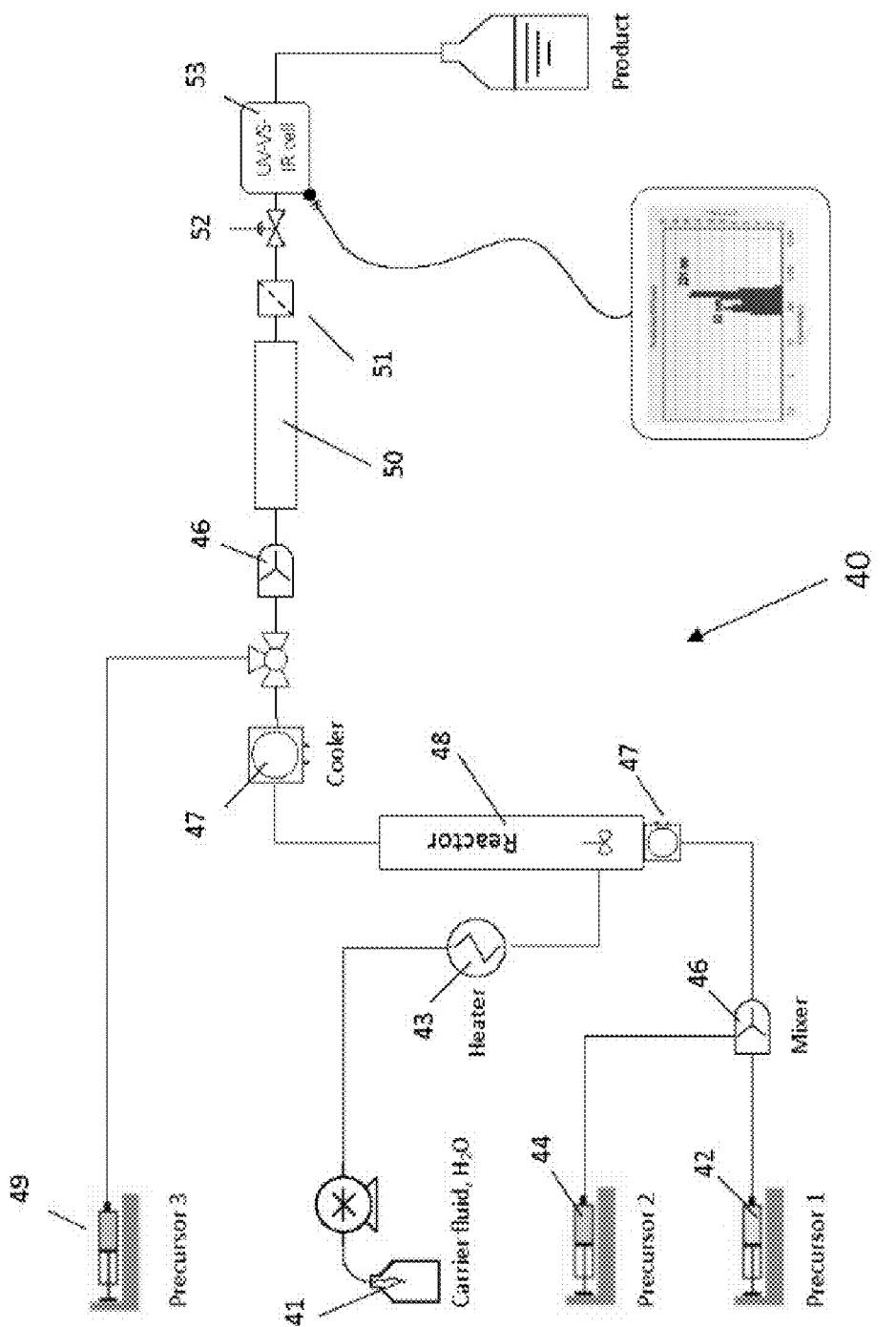
FIG. 2A is a schematic diagram of a continuous flow (hydrothermal) microreactor system for synthesizing size and shape controlled core-shell nanoparticles (e.g., nanorods), in accordance with features of the present invention.

FIG. 2A is a schematic view of a capillary based, continuous flow microreactor system, designated therein as element numeral 40, for synthesizing controlled core-shell nanoparticles. The reactants, $V_2O_5$ or $VOSO_4$ 42, and a mild acid 44 acting as a reducing agent can be mixed in advanced, or introduced separated and mixed in the mixer to make a clear liquid solution. Any compound with a pKa of about 3 or lower can be utilized. Exemplary such compounds include, but are not limited to oxalic acid, formic acid, tartaric acid, polyethylene glycol, and combinations thereof.

The resulting solution is pumped into the micro flow tubing reactor 48. Generally, a tubing with an outer diameter of less than ½ inch is suitable. Preferably, any tubing which can withstand temperatures up to 370 C. and 220 atmosphere are used. $VO_2$ nanorods (or nanoparticles) are generated in the heated tube reactor and grow continuously along the flow path in the tubing reactor; then particle growth stops in a cooler 47 situated downstream from the reactor. Optionally, another cooler 47 is placed immediately upstream of the reactor to prevent premature reactions from occurring, thereby leading to the generation of solids which can block the flow path.

A back pressure regulator 52 may be installed at the downstream of the tubing reactor to control the system pressure while simultaneously allowing the liquid to flow through. A particle collector 51 such as filter is installed in front of this pressure regulator in order to block and collect the nanoparticles (Rods) from contacting the pressure regulator. The $VO_2$ nanoparticles may be coated by $SiO_2$ through contacting with coating agents (e.g., tetraethoxysilane (TEOS), or ammonia).

The invented system continuously synthesizes nanoparticles at temperatures ranging from about 240° C. to about 450° C., and at pressures ranging from about 20 bars to about 240 bars.

The invented design implements single phase liquid flow (carrier+reactant solution), or gas-liquid 2-phase segment flow in the flow path to enhance heat transfer and maintain thermal and pressure stability within the system.

Figure 2B:
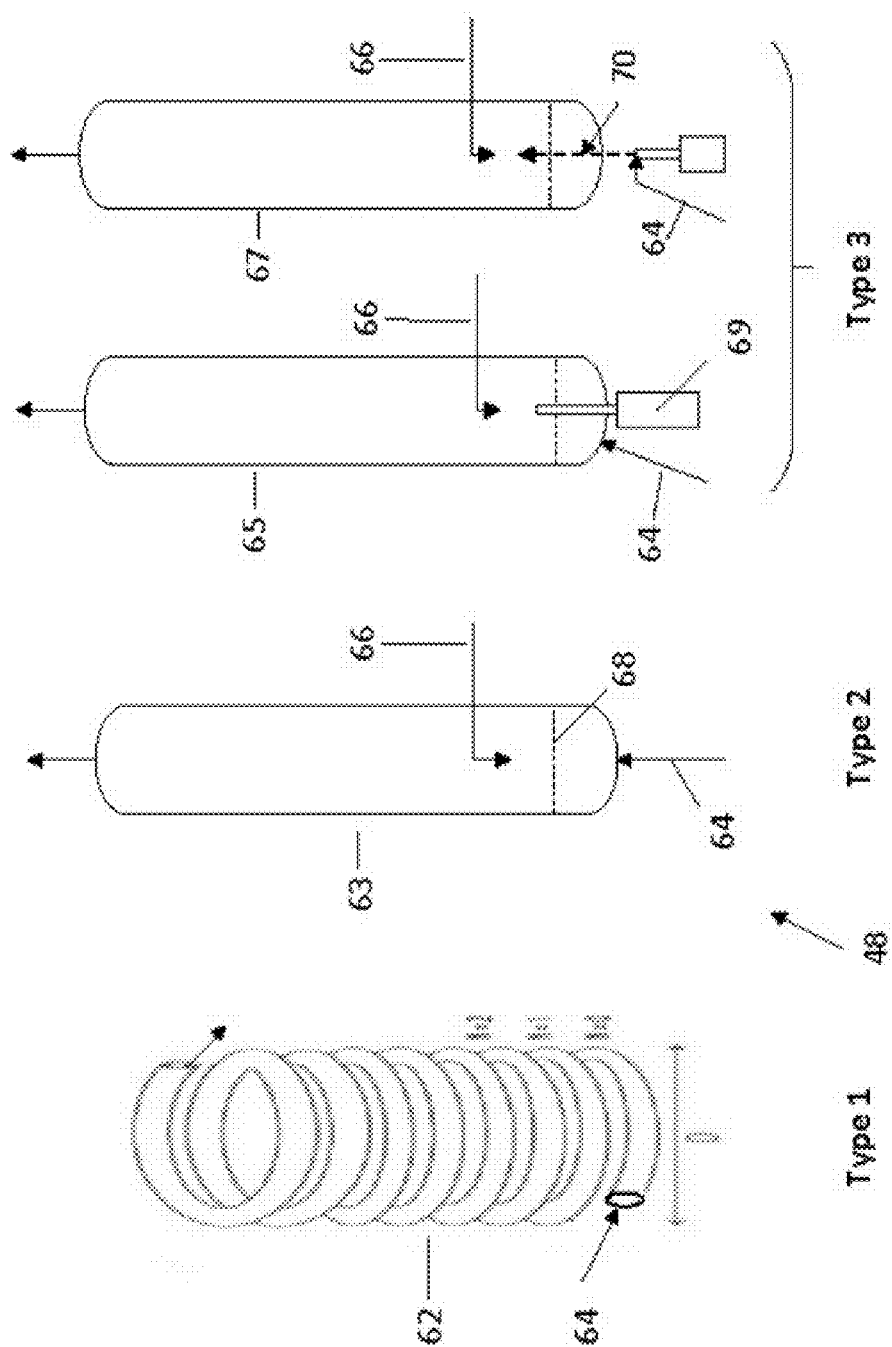
FIG. 2B depicts reactor types for use in the particle generation method, in accordance with features of the present invention.

As depicted in FIG. 2B, four types of reactors for nanoparticle synthesis [48] can be utilized, including coiled tubing reactors (62), hot water fluidized suspension reactor (63), and ultrasound probe (65), or jet (67) assisted micro reactor. The aim is to enhance heat transfer and maintain thermal and pressure stability within the system via increased heating surface area, super-heating water (66), and supersonically enhanced mixing via ultrasound probe (69) or pulsed water jet (70). This leads to an increase in the temperature raising rate.

The coil-configured reactor design provides a large heat transfer surface area. The rapidly rapid heating design features enhanced mixing. The rapid heating strategies include: 1) agitated high-temperature water; 2) ultrasound-generated water jets or pulses; 3) an ultrasound probe. The range of temperature rising speed of the precursor is 5~30° C. per second or higher. More ideally, it is the range of 15-20° C. per second.

Another invented new method is to add a surfactant into the precursor solution before the reaction run. The surfactant has two functions: One is obtain extremely highly uniform particles (see SEM image in FIG. 3A) by attaching the organic ligands on the nucleated particle surface by utilizing a spatial confining effect. The other is to reduce or even eliminate a "stick-to-wall" problem for nucleated particles since it can block the reactor. This is especially useful when the heating is conducted via the reactor wall, for example when a coil reactor (62) is used. Such surfactants for hydrothermal reaction use should be hydrophilic and withstand high temperatures. Exemplary surfactants include, but are not limited to Polyvinylphenol (PVP), (Sodium dodecyl sulfate) SDS, Polyethylene glycol (PEG), Cetyl Trimethyl Ammonium Bromide (CTAB) and 3-(trihydroxysilyl)-1-propanesulfonic acid (SIT) and others.

A plurality of precursors (42, 44) are provided and directed to a mixer 46 to create a liquor. Nitrogen may be used to generate gas bubbles that sweep the tube of the reactor clear so as to prevent nanoparticle residence in the reactor, which may otherwise block the flow path if a small ID tubing is used. One of the precursors 42 is a nanoparticle capable of transitioning from a monoclinic crystal phase to a rutile phase. As discussed above, this nanoparticle may first be doped with W, Mg, Mo, Ta, Nb, Ru, Sn and combinations thereof. This dopant may be another of the precursors 44, or premixed with the reactants. A suitable doping protocol is found in Lan, et al., Heteroepitaxial TiO2@W-doped VO2 core/shell nanocrystal films, RSC Adv., 2015, 5, 73742, the entirety of which is incorporated herein by reference.

Situated downstream from the mixer is a first microreactor 48 (i.e., the flow reactor) which embodies the hydrothermal process step 14 depicted in FIG. 1. The liquor is directed to the first microreactor 48 under pressure, for example as a result of application of pressurized carrier fluid. This first microreactor embodies a hydrothermic synthesis step for transforming the first precursor into uniform anisotropic particles.

Upon synthesis of the anisotropic particles, the particles are combined with a third precursor 49 in a second microreactor 50. This third precursor step facilitates production of the shells around the nanoparticles. Annealing then follows as needed. In embodiments of the system operating in non-ambient pressures, a back pressure regulator 52 is positioned after the second microreactor 50. This regulator optimizes pressure control through the system when the fluid and/or the system is pressurized upstream or subjected to an ambient pressure downstream.

Optionally, the system can integrate UV-VS-IR analytic equipment 54 to assess the optical and physical properties of the invented shell-core construct.

Example

Figure 3A:
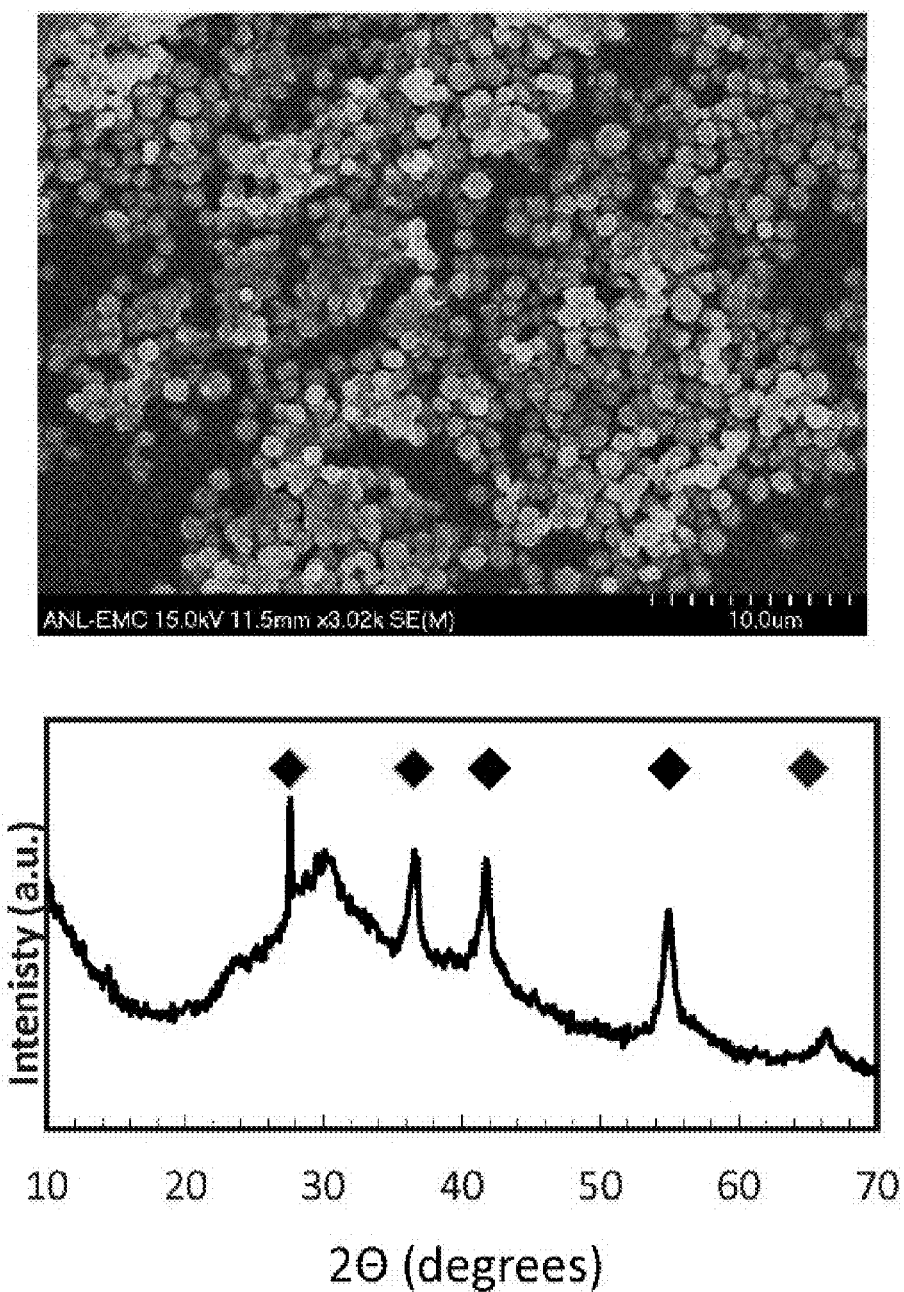
FIG. 3A is a photomicrograph and X-ray Radiation Diffraction pattern of $VO_2$ (M-phase) of $VO_2$ nanospheric material made using a coil reactor, in accordance with features of the present invention.

FIG. 3A is a photomicrograph of the invented micro-sized $VO_2$ nano-spheres made using the coil reactor. As noted supra, surfactants are added, or pH is adjusted, to tune particle morphology to become more anisoptropic and less spherical. The accompanying XRD data graph depicts the presence of target M-phase $VO_2$, that phase obtained in a single step (e.g., without a need to go with additional annealing step).

Figure 3B:
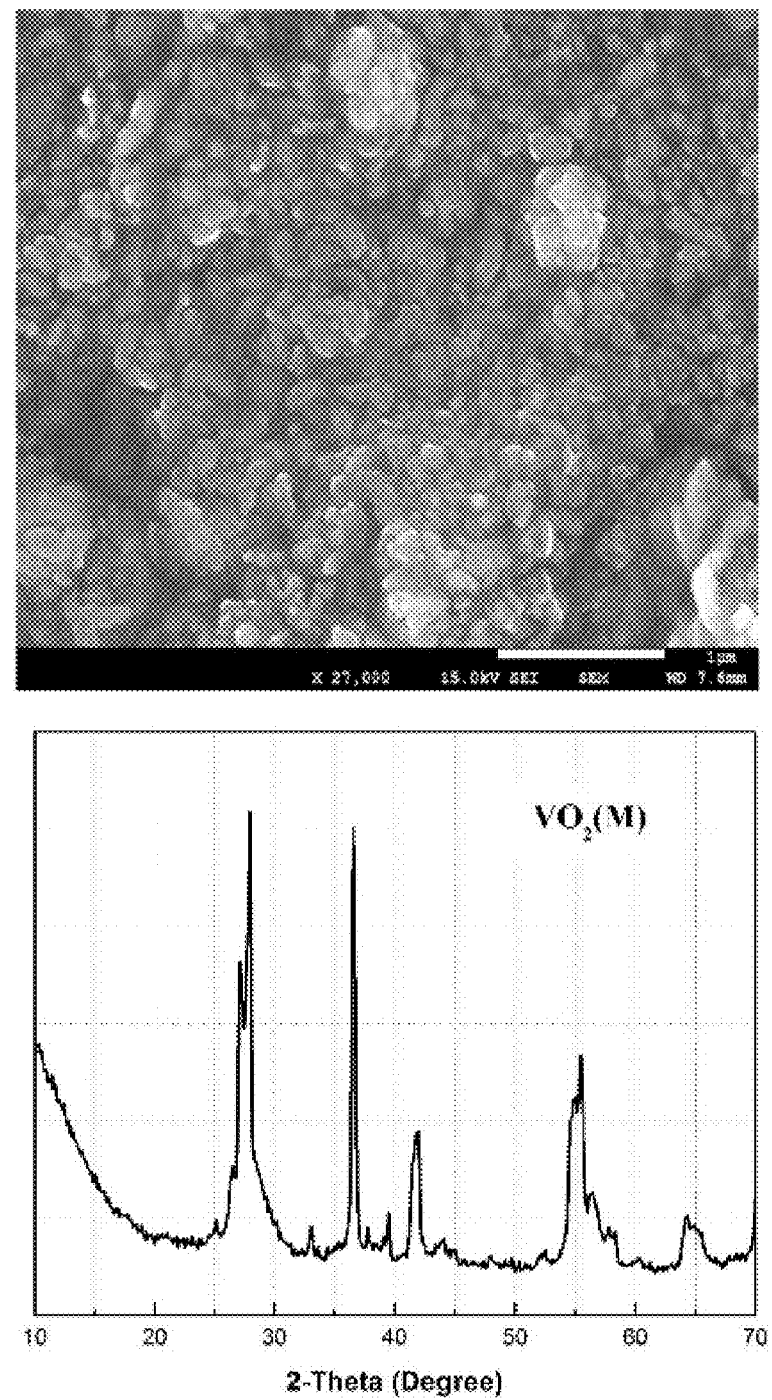
FIG. 3B is a photomicrograph and X-ray Radiation Diffraction pattern of $VO_2$ (M-phase) of $VO_2$ nanorods material made using a tube reactor, in accordance with features of the present invention.
Figure 3C:
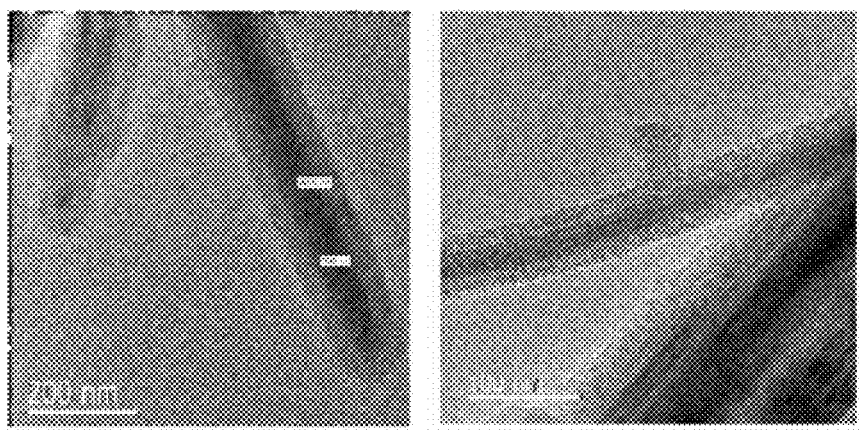
FIG. 3C is a photomicrograph of SiO2 coated VO2 rods and differential scanning calorimetry (DSC) of $VO_2$ (M-phase) nanomaterial, in accordance with features of the present invention.
Figure 3C:
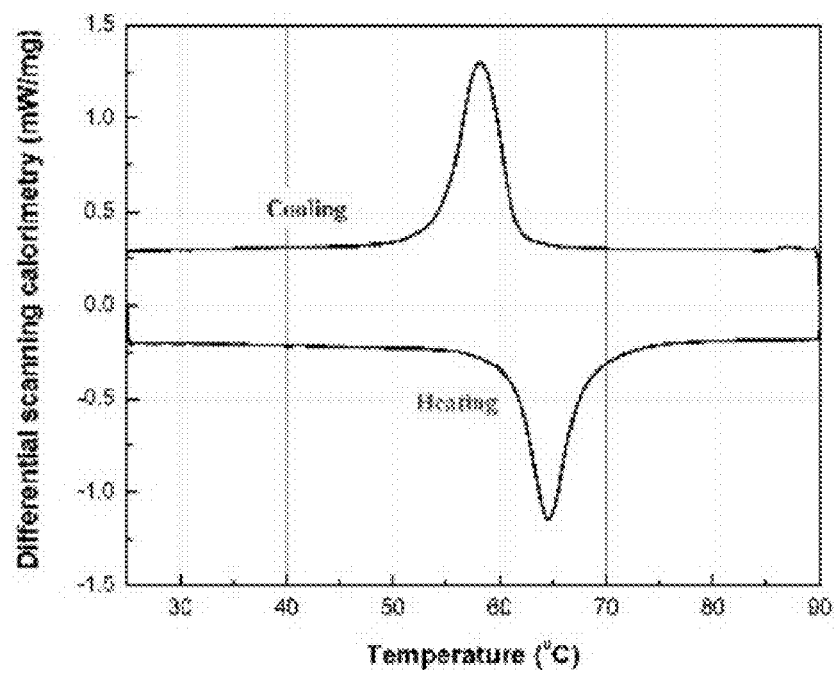

FIG. 3B is a photomicrograph and the X-ray Radiation Diffraction pattern of short (e.g., a L/D aspect ratio of no more than 3) $VO_2$(M) nanorods synthesized using a hot water fluidized suspension reactor. FIG. 3C is a photomicrograph of core-shell $VO_2/SiO_2$ rods and its transition temperatures of 65° C. (heatinging) and 57° C. (cooling) which was measured by using differential scanning calorimetry (DSC), wherein the core comprises $VO_2$ and the shell comprises $SiO_2$.

Figure 4A:
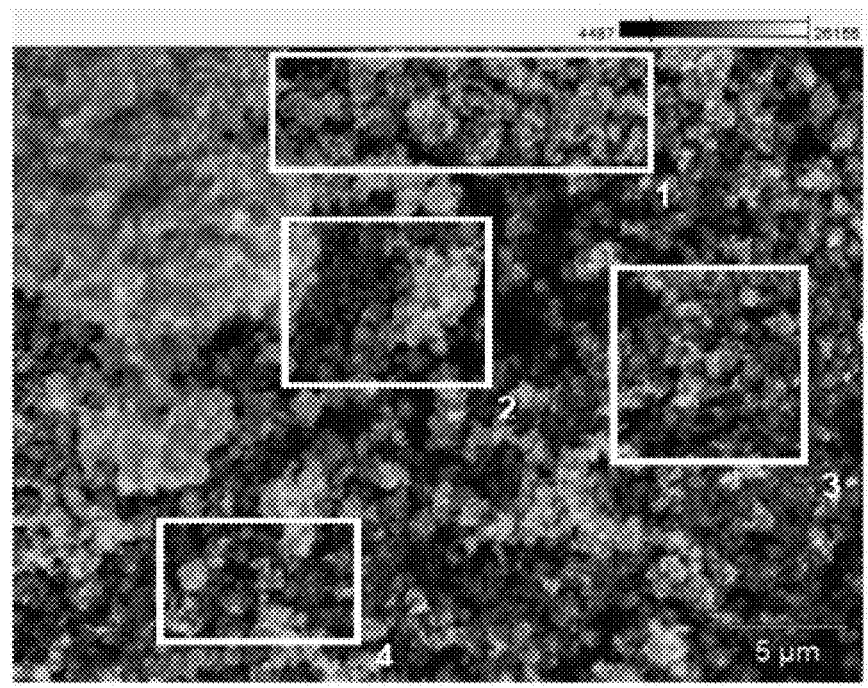
FIG. 4A is a plot of dopant concentration from an Energy Dispersive Spectroscopy (EDS) method, in accordance with features of the present invention.
Figure 4B:
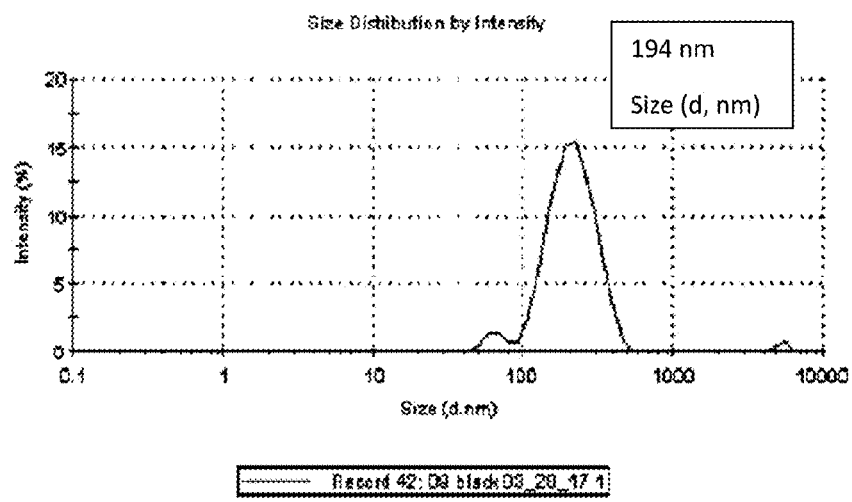
FIG. 4B is a plot micrograph and data points of the averaged nanoparticle size from a diffraction laser scattering (DLS) method, and reduced transition temperatures from the differential scanning calorimetry (DSC) for w-doped $VO_2$ (M-phase) nanoparticles as compared to that in FIG. 3C, in accordance with features of the present invention.
Figure 4B:
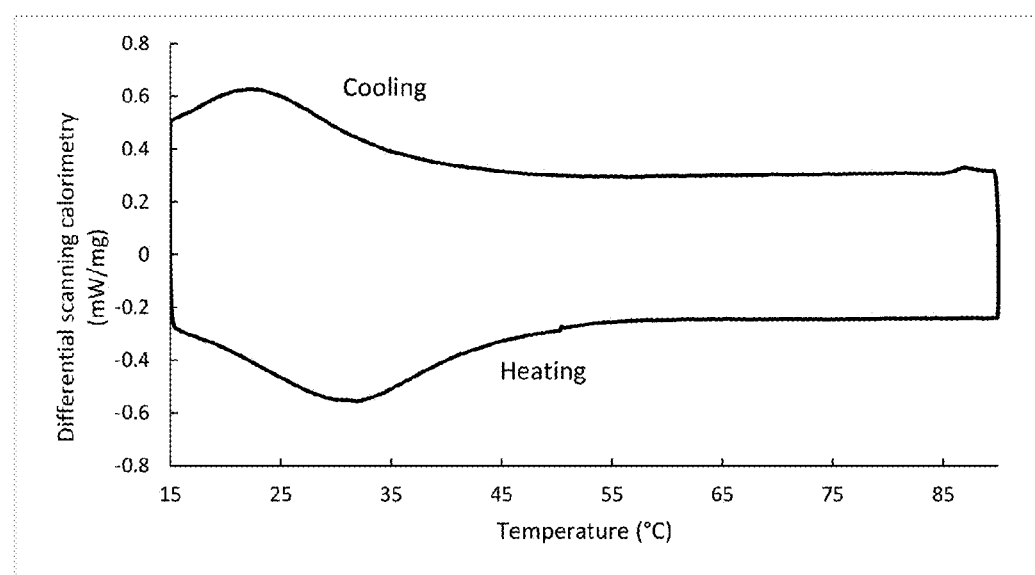

FIG. 4A contains a plot showing element distribution using a EDS method (with 3% of W doping). FIG. 4B is the averaged nanoparticle size measured, approximately 194 nm, using a diffraction laser scattering (DLS) method; and the reduced transition temperatures of approximately 30° C. for the heating cycle and 23° C. for cooling cycle measured using the differential scanning calorimetry (DSC) for w-doped $VO_2$ (M-phase) nanoparticles at doping level of 3%.

Example

As an example, reaction conditions for an exemplary bench top continuous flow core-shell particle fabrication system include a dead volume of the instruments ranging from about 15 to 18 ml. For example, 3/8" OD tubing, approximately 36 cm in length may be utilized. An HPLC pump is utilized to drive the fluids through the mixer and microreactors. A stainless steel tube reactor operated under 350° C. and 170 bar may be utilized as the flow reactor. A heat exchanger in fluid communication with the loop is utilized. Optionally, a safety relief valve is provided with a maximum pressure setting of 250 bar.

Starting material for the reaction includes 3.15 grams of $V_2O_5$, 6.255 grams of $H_2C_2O_4 \cdot 2H_2O$ and volume make up of approximately 450 ml deionized water (with a concentration of 0.0356 mol/L). Ultrasonic bath was applied to the reaction mixture for approximately 20 minutes or longer as needed under about 60° C. Typically, in a hydrothermal experimental run, 50 ml of the precursor prepared was used. A flow rate of about 5 ml/min for precursor flow, and 10 ml/min for heating water were utilized. According to thermal decomposition temperature of the $V^{4+}$ precursor, the reaction temperature is set a value that is equal to or higher than such a decomposition temperature, for example 342° C. for $VO(C_2H4)_2$, in order to obtain a super-saturated solution. On this basis, the flowrate, pressure and temperature can vary systematically to conduct the synthesis. Experimental results are shown in FIG. 3, indicating the synthesized material is $VO_2$ nanorods having A phase or B phase structure at a low temperature e.g. <300° C., and M phase at a high temperature. After annealing of the A, or B phase powder material, the required $VO_2$ (M) is obtained. Conversion starts about 550° C. and fully converted around 850° C.

A W-doped precursor can be prepared by adding 3 mole percent $Na_2WO_3$. (An exemplary mole ratio of W to that of V ion is in the range of 0.5-5 percent.) Then the same procedure as described above can be used to make the doped having reduced transition temperatures.

FIG. 4A is a photomicrograph of composite material and a graph of elemental analysis for four regions of that composite material. Specifically, FIG. 4A shows the tungsten (W) concentration, and its distributions at four locations as measured by using an EDS method. The results indicate a uniform distribution of W in the $VO_2$ nanoparticles synthesized.

FIG. 4B shows a plot of the averaged nanoparticle size, approximately 194 nm, and its distribution from a diffraction laser scattering (DLS) method; as well as reduced transition temperatures of 30 and 23° C. for heating and cooling respectively measured from the differential scanning calorimetry (DSC) for $VO_2$ nanoparticles as-synthesized. By comparing to the corresponding transition temperatures of 65 and 57° C. in FIG. 3C respectively for an un-doped sample, we can conclude that our system can be used to perform element doping of nanoparticles successfully.

FIG. 5 is a schematic of the SPR phenomenon which is leveraged by the invented system and method. It depicts surface plasmon resonance due to coherent interaction of the elections in the conduction band of the core particle with photons in the light. When the wavelength of light is larger than the nanoparticle, it establishes standing resonance conditions. Light in resonance with the surface plasmon oscillation causes the free electrons in the metal to oscillate. As the wave front of the light passes, the electron density in the particle is polarized to one surface and oscillates in resonance with the light's frequency causing a standing oscillation of electrons across the surface of the particle. The resonance condition depends on the shape, size and dielectric constraints of the particle and the surrounding material. As the shape or size of the nanoparticle changes, the surface geometry changes, causing a shift in the electric field density on the surface. This causes a change in the oscillation frequency of the electrons, generating different cross sections for the optical properties, including absorption and scattering. The inventors found that anisotropic particles exaggerate this frequency change, therefore resulting in exaggerated absorptions.

Figure 6:
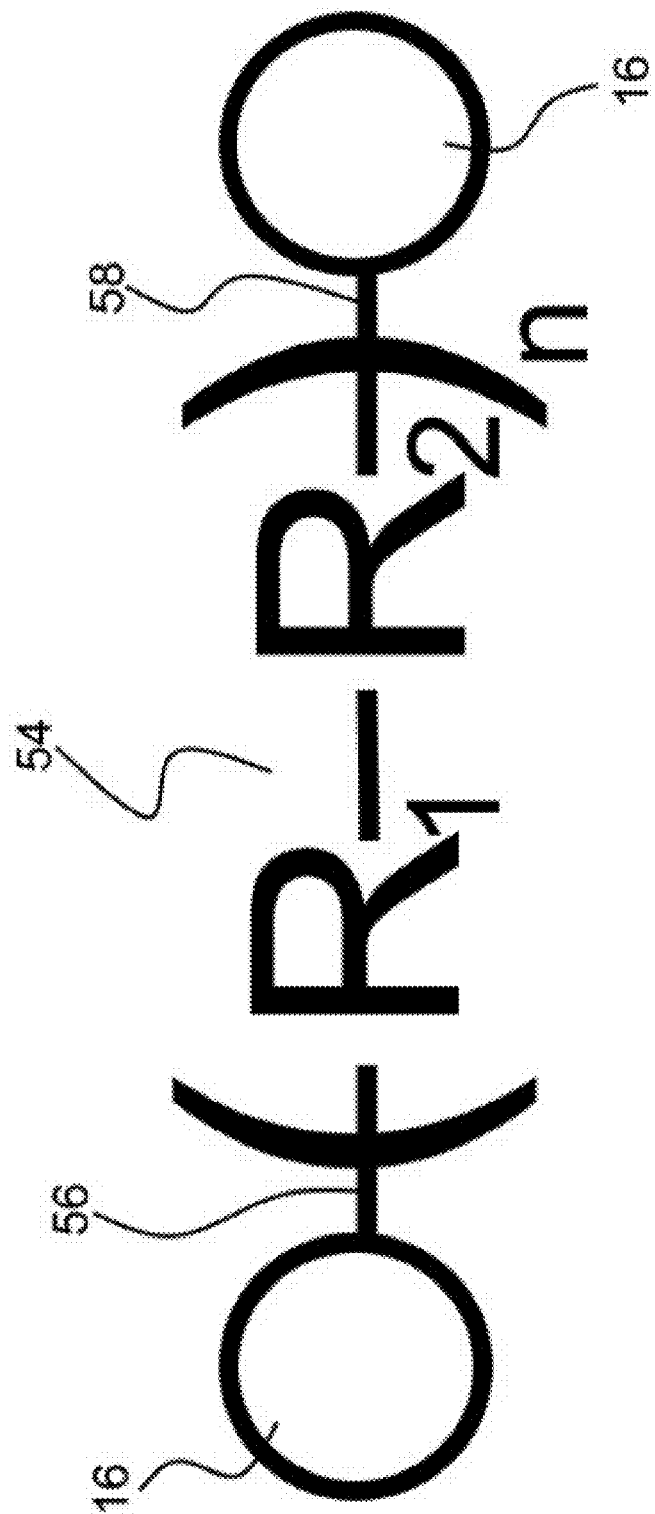
FIG. 6 is a schematic depiction of interstitially positioned polymer, in accordance with features of the present invention.

FIG. 6 depicts a method for establishing interparticle distance defining the interstitial sites between nanoparticles 16. Generally, polymers 54 having a first end 56 and a second end 58 are each attached to different particles 16. This length, to be preselected depending on the length of the polymers, determines the separation distance between the nanoparticles. Exemplary polymer lengths range from between about 350 nm and 600 nm (which is half of the infrared wavelength to be blocked). Exemplary supramolecular polymers include, but are not limited to polystyrene-b-poly-4-vinylpyridine with 3-pentadecylphenol [or PS-b-P4VP (PDP)], polystyrene-b-polyisoprene (or PS-b-PI), poly(methyl methacrylate)-b-poly(n-butyl acrylate) (PMMA-b-PnBA) and combinations thereof. Details of nanoparticle self assembling using interparticle polymers are described in Nano Letters 2012. 12 498-504, the entirety of which is incorporated herein by reference.

In summary, the invention provides thermochromic window starting materials that make possible the retrofitting of existing windows or creation of new high performance windows, and wide adoption in buildings, automobiles, and other window applications. The process is simple to implement inasmuch as it incorporates a plastic-based window coating. No wires or power supplies, moving parts or externally applied fields (other than naturally provided sunlight) are required to fully leverage the dynamic window advantages conferred by the invention.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A continuous flow method for producing composite nanoparticles, the method comprising:
    a) selecting a first compound capable of transitioning from a monoclinic state to a tetragonal rutile crystal state;
    b) subjecting the first compound to a hydrothermal synthesis in a first continuous flow reactor to create anisotropic crystals of the compound;
    c) encapsulating the first compound with a second compound in a second continuous flow reactor to create a core-shell construct; and
    d) annealing the construct if the crystals are A phase or B phase to produce M phase anisotropic crystals, wherein the annealing occurs in an inert atmosphere.

2. The method according to claim 1, wherein the hydrothermal synthesis occurs at temperatures ranging from about 240° C. to about 450° C.

3. The method according to claim 1, wherein the anisotropic crystals are between about 10 nm and about 500 nm long and between about 1 nm and about 100 nm in diameter.

4. The method according to claim 1, wherein the first compound is $VO_2$.

5. The method according to claim 1, wherein the anisotropic crystals are the same size.

6. The method according to claim 1, wherein the anneal step comprises heating the construct to between about 400° C. and about 1000° C. for between about 0.5 hours and about 1 hour.

7. The method according to claim 1, wherein the first compound is doped with elements selected from the group consisting of W, Mg, Mo, Ta, and combinations thereof.

8. The method according to claim 1, wherein the second compound is $SiO_2$.

9. The method according to claim 1, wherein the composite nanoparticles are produced at temperatures higher than about 240° C. but below about 450° C., at pressures below about 240 bar, and a resident time within about 1 hour.

10. A continuous flow method for producing composite nanoparticles, the method comprising:
    a) selecting a first compound capable of transitioning from a monoclinic state to a tetragonal rutile crystal state;
    b) subjecting the first compound to a hydrothermal synthesis in a first continuous flow reactor to create pure M-phase anisotropic crystals of the compound; and
    c) encapsulating the first compound with a second compound in a second continuous flow reactor to create a core-shell construct.

11. The method according to claim 10, wherein the first compound is subjected to a temperature rise of 5° C. to about 30° C. per second.

12. The method according to claim 10, wherein the composite nanoparticles are produced within about an hour.

\* \* \* \* \*